May 19, 1970     B. W. NANCE     3,512,397
METHOD AND APPARATUS FOR MEASURING QUALITY OF FLUIDS
Filed June 20, 1968     2 Sheets-Sheet 1

INVENTOR
BILLY W. NANCE

BY William J. French
William P. Heath, Jr.
ATTORNEY

May 19, 1970  B. W. NANCE  3,512,397
METHOD AND APPARATUS FOR MEASURING QUALITY OF FLUIDS
Filed June 20, 1968  2 Sheets-Sheet 2
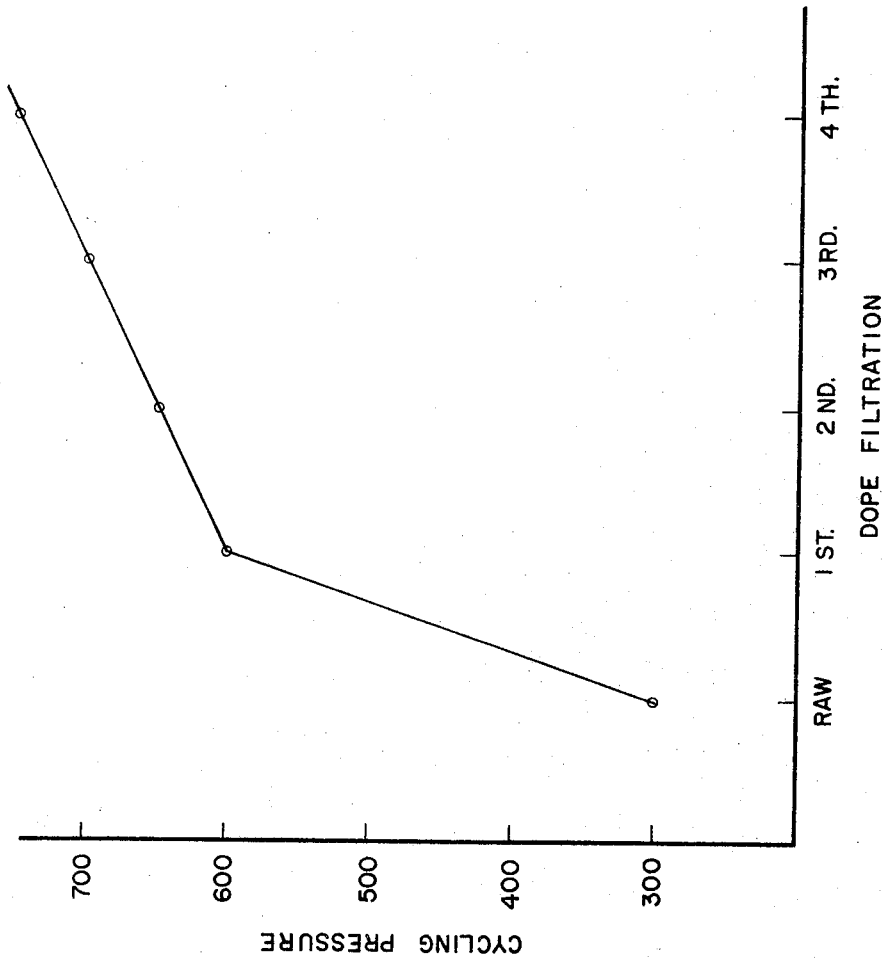
BILLY W. NANCE
INVENTOR.
BY William J. French
William P. Heath, Jr.
ATTORNEYS United States Patent Office 3,512,397
Patented May 19, 1970

3,512,397
METHOD AND APPARATUS FOR MEASURING QUALITY OF FLUIDS
Billy W. Nance, Kingsport, Tenn., assignor to Eastman Kodak Company, Rochester, N.Y., a corporation of New Jersey
Filed June 20, 1968, Ser. No. 738,444
Int. Cl. G01n *11/04*
U.S. Cl. 73—61
11 Claims

ABSTRACT OF THE DISCLOSURE

The method for determining the uniformity of a fluid stream containing inhomogeneous materials in which a stream of the fluid is established and maintained at a constant flow rate. The stream is confined and channeled through a variable restricting orifice and the measurement of the cycling pressure of the stream passing through the orifice at a point adjacent to it is a measure of the uniformity of the stream.

---

Figure 1:
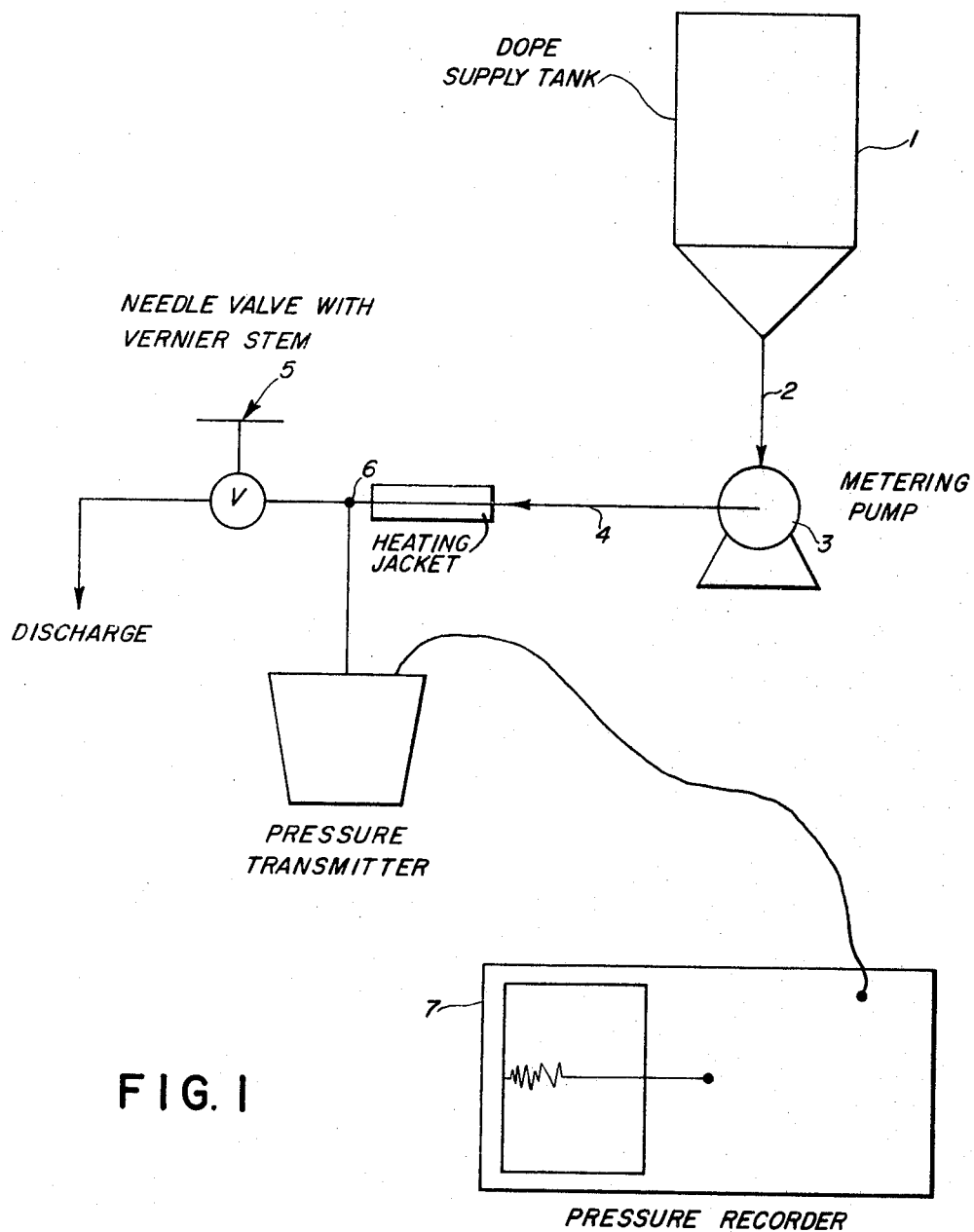

This invention relates to a method and apparatus for measuring the quality of a flowing fluid. More particularly, the invention relates to a method and apparatus for measuring the homogeneity of a flowing fluid.

There are many instances in which it is highly desirable, if not necessary, to continuously measure the amount and size of various particles being carried in a stream of flowing fluids. One case in which this is particularly true is in the spinning of synthetic fibers. For example, in the spinning of cellulosic fibers such as cellulose acetate, it is necessary to note both the size and number of particles being fed with the flowing fluid to the spinnerette assembly since these two variables noticeably affect the quality of the end product.

Various methods have been proposed for measuring the inhomogeneous materials carried in a flowing fluid. For example, the quality of spinning dopes has been determined by a method called "dope filterability." This filterability is a measure of the rate of plugging of a certain filter dress by the dope in question. However, reproducibility of results using this method is both relatively poor and requires an excessive amount of time to obtain. Thus, as will be appreciated, the development of a method and apparatus which would accurately and speedily determine the amount and size of the particles carried in a flowing fluid would represent a substantial step forward in the art.

According to this invention a method and apparatus has been developed for measuring the size and quantity of inhomogeneous materials carried in a flowing fluid. This method and apparatus, which is particularly well adapted for use in measuring the uniformity of a spinning dope, involves the determination of the "cycling" pressure as the fluid passes through a variable restricting orifice at a constant rate of flow.

Therefore, an object of this invention is to provide a method and apparatus for continuously and accurately measuring the size and quantity of inhomogeneous materials carried in a flowing fluid.

Another object of this invention is to provide a method and apparatus for measuring the uniformity of a flowing fluid by determining the fluid cycling pressure as the fluid is passed through a variable restriction at a constant rate of flow.

Yet another object of this invention is to provide a method and apparatus for measuring the uniformity of spinning solutions or dopes which is simple, inexpensive, highly accurate, and requires little or no maintenance.

These and other objects and advantages of this invention have been achieved based on rheological studies made which indicate that a phenomenon termed "melt fracture" occurs as a spinning dope or other type of fluid containing inhomogeneous materials admixed therein is passed through a variable restricting orifice at a constant flow rate. When the shearing force on an inhomogeneous material contained within a fluid stream, such as the polymeric materials admixed within an acetate spinning dope, reaches a certain value, the attractive force between molecules if broken, causing a breakdown in viscosity. I have discovered that the fluid pressure at which melt fracture occurs is a function of the homogeneity or uniformity of the particular fluid in question. That pressure at which melt fracture occurs I have herein termed the "cycling" pressure. The operation of my invention involves a method and apparatus for measuring the uniformity of a fluid stream by determining this fluid cycling pressure.

The apparatus of my invention comprises a flow pipe for the fluid stream, a variable restricting orifice in the flow pipe, and a pressure sensing means in said flow pipe adjacent to the variable restricting orifice, whereby the cycling pressure of the fluid stream passing through the restricting orifice at a substantially contant flow rate is detected by the pressure sensing means. This cycling pressure is used to indicate the size and the quantity of the inhomogeneous materials within the fluid stream.

Especially useful is an apparatus as described above wherein the pressure sensing means is upstream from the variable restricting orifice. In addition, a pump can be installed in series with the flow pipe to maintain a substantially constant flow rate of the fluid stream to be tested through the flow pipe. Also, a recorder can be connected to the pressure sensing means to continuously record and monitor fluid pressure fluctuations.

According to the construction of the apparatus hereinabove set forth, this invention provides a simple, economical method for the determination of the uniformity of a fluid stream containing inhomogeneous materials admixed therein, comprising the steps of establishing and maintaining a stream of said fluid flowing at a substantially constant flow rate, confining and channeling said stream through a variable restricting orifice, variably restricting said orifice, and measuring the cycling pressure of the fluid stream passing through the variable restricting orifice at a point adjacent to the variable restricting orifice, thereby obtaining a measure of the uniformity of the fluid stream.

The apparatus and method of this invention, although especially well adapted for use in measuring the uniformity of a spinning dope can be advantageously used in a number of other applications as well. For instance, this invention could be adapted to monitor the uniformity of any liquid such as oils, paints, or polymer melts suspected of containing inhomogeneous gels or other undesirable materials. The invention is especially useful in any type of fluid medium comprising a liquid carrier containing a substantial amount of long-chain organic substances admixed or suspended therein. In general, this invention can be adapted for measuring the homogeneity of any fluid carrier containing lumpy, coagulated particles or similar materials admixed therein.

A fuller understanding of the apparatus of this invention can be obtained by reference to the accompanying specification, claims, and figures wherein:

FIG. 1 is a diagrammatic representation of an installation of the apparatus constructed in accordance to one embodiment of this invention; and FIG. 2 is a graph showing the results obtained by using the invention.

As shown in FIG. 1 a supply tank 1 is depicted merely to indicate a source of supply for the fluid to be measured. A flowing stream of this fluid 2 is transported from the supply tank and into a flow pipe 4 wherein the actual measurement of the fluid uniformity is made. Any conventional means can be adopted to establish and maintain a stream of this fluid flowing into the flow pipe 4 at a substantially constant flow rate. According to the embodiment of my invention shown in FIG. 1, a positive displacement gear pump 3 with attached flowmeter (not shown) is used to provide a constant flow rate and a visual confirmation of the flow rate as the fluid stream is pumped into the flow pipe.

Within the flow pipe, which comprises what shall hereinafter be referred to as the "measuring zone," is a variable restricting orifice 5. According to the embodiment of my invention in FIG. 1, the variable restricting orifice is a needle valve with vernier stem. The material to be tested is transported through the variable restricting orifice by a pump 3. A cyclic pattern of pressure fluctuations develops as the fluid stream passes through the variable restricting orifice and is measured by a pressure sensing device 6, which in turn transmits this information to a pressure recorder 7. The recorder 7 continuously records and monitors the fluid pressure fluctuations. Any of numerous well-known pressure sensing devices and recorders can be used. These pressure fluctuations are regulated by the orifice which is variable restricted; that is, the size of the orifice can be enlarged or contracted, the desired size of orifice opening depending upon the individual material to be tested.

The result of my rheological studies show that at relatively low pressures the pressure measured by the pressure sensing device holds steadily to the point originally established by adjustment of the orifice opening. However, as the opening is made smaller particles or gels admixed within the flowing stream are trapped by the orifice. The pressure builds up until the phenomenon termed "melt fracture" occurs. The particles or gels then pass through the orifice 5; the pressure build-up terminates and the pressure returns to the original set point; and the above described chain of events begins anew, thereby creating a repetitious or cyclic pressure pattern which can easily be monitored, recorded, and calibrated for a particular fluid. Further, research with numerous fluid materials has revealed that the particular pressure at which melt fracture occurs is indeed a function of the quality or uniformity of the particular fluid. The pressure at which particles begin to be trapped in the orifice prior to melt fracture has been designated the cycling pressure. The smaller the particles within the fluid or the more uniform the dope, the smaller the orifice opening must be set before trapping the particles, and hence, the higher the pressure before the cycling pressure is reached or melt fracture occurs. For this reason a high cycling pressure will be recorded for a nearly uniform fluid or dope.

To demonstrate the usefulness of this invention the following examples are provided.

EXAMPLE 1

Several samples of acetate dope were tested with the apparatus of FIG. 1 to determine if a cycling pressure could be found. As noted in Table 1 and the graph of FIG. 2 a cycling pressure was determined for each sample and indeed is a measurable property of the dope.

TABLE 1

| Sample No. | Sample composition | Cycling pressure |
|---|---|---|
| 1 | Raw dope | 300 |
| 2 | Dope filtered once | 600 |
| 3 | Dope filtered twice | 650 |
| 4 | Dope filtered three times | 700 |
| 5 | Dope filtered four times | 750 |

EXAMPLE 2

Several tests were run on samples of the same acetate dope to determine the reproducibility of results. As shown in Table 2 the results of four tests on the same dope gave cycling pressures of 400, 400, 350, and 400 p.s.i. This data indicates a good reproducibility of results.

TABLE 2

| Sample No. | Sample composition | Cycling pressure |
|---|---|---|
| 1 | Acetate dope filtered once | 400 |
| 2 | do | 400 |
| 3 | do | 350 |
| 4 | do | 400 |

EXAMPLE 3

A sample of unspinnable, unfiltered acetate dope was tested and found to have a cycling pressure of 300 p.s.i. The dope was then filtered four times to produce a dope of spinning quality and tested after each filtration. Results are recorded in Table 3.

TABLE 3

| Sample No. | Sample composition | Cycling pressure |
|---|---|---|
| 1 | Raw unspinnable dope | 300 |
| 2 | Dope Filtered One Time | 600 |
| 3 | Dope Filtered Two Times | 650 |
| 4 | Dope Filtered Three Times | 700 |
| 5 | Dope Filtered Four Times | 750 |

These data of Table 3 demonstrate that, as the dope is successively filtered and becomes more uniform, the cycling pressure increases. In addition, these data indicate that this test is sensitive to small differences in dope quality and can be used to measure these differences.

My research shows that the cycling pressure is a function of the physical construction of the particular apparatus used, and for this reason, no absolute scale of the cycling pressure of a specific fluid or dope can be determined for all systems. For instance, different types and sizes of flow pipes, pumps, or restricting orifices produce substantially dissimilar pressure drops through the apparatus, thereby making pressure readings on a given fluid different for each installation. Hence, each installation of the apparatus of my invention should be individually calibrated for a given fluid. In addition pressure drops through the lines and valves through which the fluid passes en route to and from the measuring zone can influence the apparatus. Therefore, the pressure sensing device of the apparatus should be located as close to the variable restricting orifice as possible to increase sensitivity.

There are several further modifications which can be made in my invention with added advantages. For instance, a pressure indicating gauge for visual observations can be substituted for or used in combination with the recorder of FIG. 1. Also, a needle valve with a micrometer dial on the stem or some other type of suitably calibrated orifice regulating device can be substituted for the needle valve of FIG. 1. The position of the calibrated valve or other type of calibrated orifice device can be read directly in order to correlate valve position and cycling pressure thereby eliminating errors in reading these pressures.

The apparatus of this invention can also be adapted to test the quality of uniformity of various special types of fluidized media. For instance, it can easily be fitted with a heating jacket to provide a fluid at a constant temperature to the restricting orifice.

This invention has been described in detail with particular reference to preferred embodiments thereof, but it will be understood that variations and modifications can be effected within the spirit and scope of the invention.

I claim:

1. A method of measuring the uniformity of a fluid containing inhomogeneous material therewithin, comprising the steps of establishing and maintaining a stream of said fluid flowing at a substantially constant flow rate, confining and channeling said stream through a variable restricting orifice, variably restricting said orifice, and measuring the cycling pressure of the fluid stream passing through the restricting orifice at a point adjacent to the restricting orifice, thereby obtaining a measure of the uniformity of the fluid.

2. The method of claim 1 wherein the measuring point for the fluid pressure is upstream from the variable restricting orifice.

3. A method according to claim 1 wherein the inhomogeneous materials comprise a substantial amount of long-chain organic materials.

4. In a method for measuring the size and quantity of inhomogeneous materials contained within a fluid stream by determining the fluid cycling pressure, the steps which comprise channeling the fluid stream through a variable restricting orifice at a substantially constant flow rate; variably restricting said orifice until a pressure sensing means adjacent to said orifice detects a fluid pressure build-up occurring at the orifice; and recording that pressure at which melt fracture occurs, thereby obtaining the cycling pressure of the fluid.

5. The method of claim 4 and further including the steps of continuously recording and monitoring the fluid pressure thereby providing a continuous measurement of the uniformity of the fluid stream.

6. A method of measuring the uniformity of a spinning dope comprising the steps of establishing and maintaining a stream of said dope flowing at a substantially constant flow rate, confining and channeling said stream through a variable restricting orifice, variable restricting said orifice, and measuring the fluid pressure build-up and subsequent cycling pressure as the spinning dope passes through the restricting orifice at a point adjacent to and upstream from said restricting orifice, thereby obtaining a measure of the uniformity of the spinning dope.

7. A method according to claim 6 wherein said spinning dope is an acetate spinning dope.

8. Apparatus for measuring the size and quantity of inhomogeneous materials contained in a fluid stream, comprising a flow pipe for the fluid stream, a restricting orifice in said flow pipe, said restricting orifice comprising a needle valve, and pressure sensing means in said flow pipe upstream from the restricting orifice, whereby the cycling pressure of the fluid stream passing through the restricting orifice at a substantially constant flow rate is detected by the pressure sensing means, thereby indicating the size and quantity of inhomogeneous materials within the fluid stream.

9. Apparatus according to claim 8 wherein a heating jacket is fitted to the flow pipe to provide a fluid at a constant temperature to the restricting orifice.

10. Apparatus for measuring the size and quantity of inhomogeneous materials contained in a fluid stream, comprising a flow pipe for the fluid stream, a restricting orifice in said flow pipe, pressure sensing means in said flow pipe adjacent said restricting orifice, a pump, said pump maintaining a substantially constant flow rate of the fluid stream through the flow pipe, and recording means connected to the pressure sensing means continuously recording and monitoring fluid pressure whereby the cycling pressure of the fluid stream passing through the restricting orifice at a substantially constant flow rate is detected by the pressure sensing means thereby providing a continuous measurement of the size and quantity of inhomogeneous materials within the fluid stream.

11. Apparatus for measuring the uniformity of a spinning dope comprising a flow pipe for the dope, a restricting orifice comprising a needle valve in said flow pipe, pessure sensing means in said flow pipe adjacent to and upstream from said restricting orifice, and recording means connected to the pressure sensing means so that the cycling pressure of the dope passing through the restricting orifice at a constant flow rate is detected by the pressure sensing means and the recording means connected to the pressure sensing means continuously monitors and records dope pressures to thereby provide a continuous measurement of the uniformity of the fluid stream.

References Cited

UNITED STATES PATENTS

| 2,868,225 | 1/1959 | Wigham et al. | 73—207 X |
| 3,116,630 | 1/1964 | Piros | 73—55 |
| 3,024,643 | 3/1962 | Jones | 73—55 |
| 3,048,030 | 8/1962 | De Haven | 733—56 |

S. CLEMENT SWISHER, Primary Examiner

J. W. ROSKOS, Assistant Examiner

U.S. Cl. X.R.

73—207